Patented Apr. 18, 1939

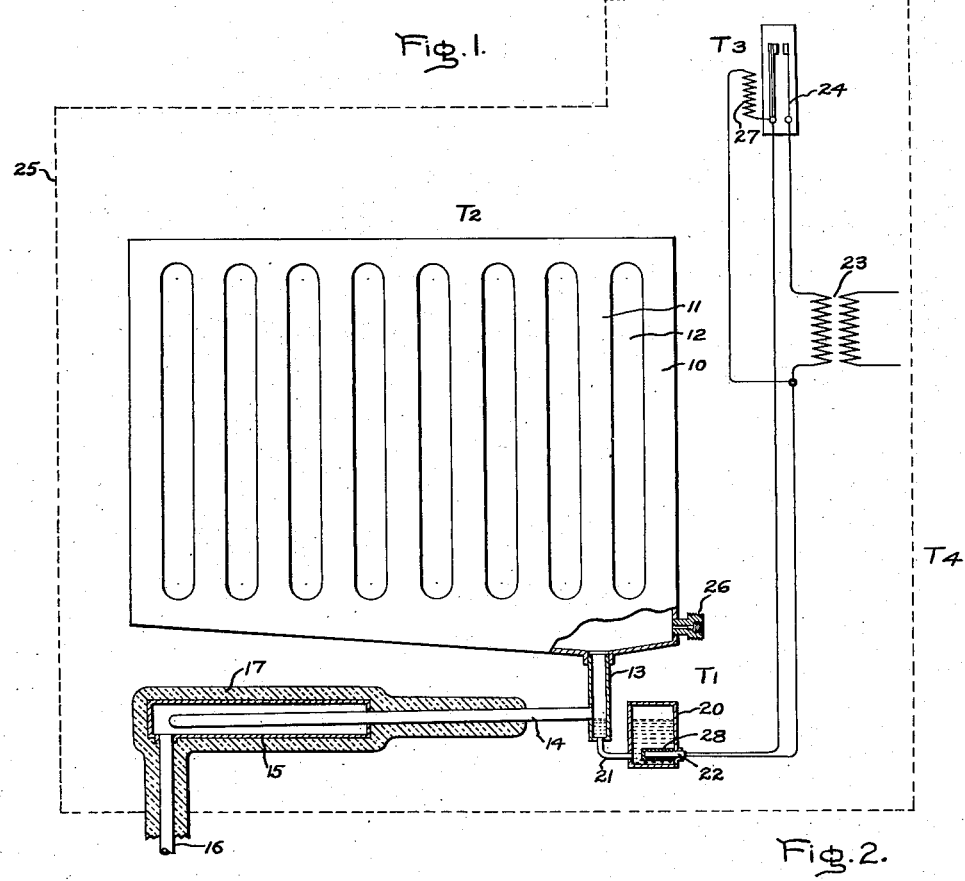
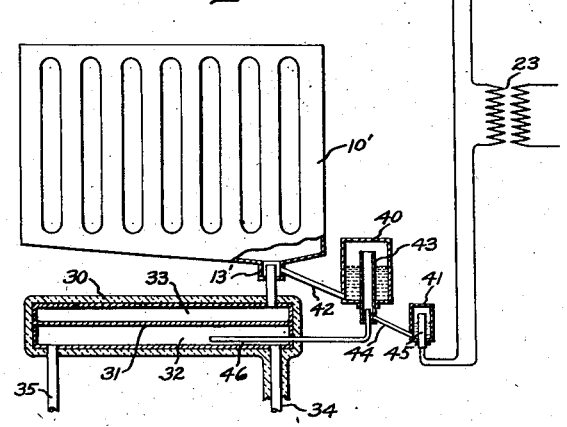
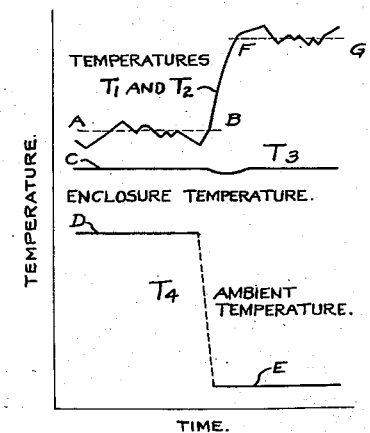
Inventor:
Marcus E. Fiene,
by Harry E. Dunham
His Attorney.

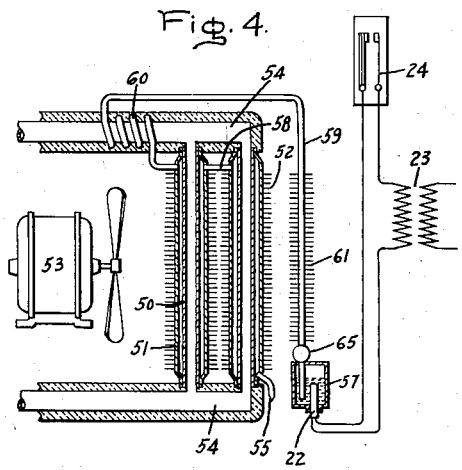

2,155,261

UNITED STATES PATENT OFFICE 2,155,261

HEAT TRANSFER SYSTEM

Marcus E. Fiene, Ballston Lake, N. Y., assignor to General Electric Company, a corporation of New York Application June 8, 1935, Serial No. 25,691

12 Claims. (Cl. 237—9)

This invention relates to the transfer of heat particularly by the vaporization and condensation of fluid and provides an improved system having a thermostatic modulating control that may be used in a wide field of service although of special advantage in releasing heat from a steam supply source for room air heating, water heating and other similar work.

The principal object is to provide an improved system for transferring heat at variable rates to maintain a predetermined temperature condition substantially constant. A further object is to provide an improved system for transferring heat with thermostatic control intermittently operable for varying the rate of heat transfer as an intermittent function of the variations in a temperature condition from a predetermined value.

One of the other objects is to provide an improved control whereby the transfer of a large amount of heat may be readily and accurately controlled by varying the supply of a relatively small amount of heat. In this way, in effect, heat amplification may be obtained.

Another object is to provide an improved system wherein the temperature of a heat dissipating body such as a radiator or the like will automatically equalize at all times with the temperature of a control body which may be varied throughout a wide range without appreciable heat transfer between the control body and the heat dissipating body.

A further object is to provide an improved static control capable of regulating the flow of heat from a source to a dissipating body without any moving parts such as valves, baffles or the like, and which may be easily controlled by a sensitive and relatively feeble device such as a thermostat or the like.

A still further object is to provide improved electrical means for controlling the transfer of heat substantially in accordance with variations in an electrical current.

While not limited thereto, the improved heat transfer system of the present invention is particularly advantageous in heating service where a thermostatically graduated or modulated variation in the rate of heat transfer is desired rather than an on and off control of the heat. Thus by means of the present invention the rate of heat transfer to a radiator for heating air or liquid may be modulated smoothly and quickly between wide limits to meet widely varying heating requirements.

Briefly, in carrying out the present invention in a preferred form, a circulating fluid heat transfer system having a fluid vaporizing surface and a condensing surface in fluid circulating relation is connected to receive heat from a suitable source such as a steam supply main or the like and is provided with a liquid control chamber or condensate accumulating reservoir which is preferably out of heat transfer relation with the circulating system and has a separate pilot heater therefor. In such arrangement the vaporizing surface receives heat from the source and the condensing surface releases the heat to the air, water or other medium which is to be heated. The liquid control chamber is so arranged and connected that when the separate pilot heater is inactive, substantially all of the vapor in the heat transfer system condenses and accumulates as liquid in the liquid control chamber and remains trapped therein. Under these conditions, substantially no transfer of heat from the supply source can occur.

However, upon operation of the pilot heater to raise the temperature of the liquid in the control chamber, the fluid pressure in the control chamber is increased and liquid is expelled therefrom into the heat transfer system. The expelled liquid then serves to effect the transfer of heat from the heat source through the vaporizing surface to the condensing surface.

The present invention operates upon the fundamental principle that the liquid expelled from the control chamber into the vapor heat transfer system is always automatically proportioned to the proper amount required to bring the condenser surface substantially to the same temperature as the temperature of the liquid in the control chamber until the temperature of the heat source is approached. Thus with the condenser surface subject to widely varying heat dissipating conditions the amount of liquid expelled from the control chamber into the vapor heat transfer system will vary correspondingly so that the transfer of heat from the heat source through the vaporizing surface to the condensing surface always occurs at the proper rate required to maintain the condensing surface temperature substantially the same as the temperature of the liquid in the control chamber. In other words, the improved heat transfer system automatically operates to establish a thermal equilibrium and also a hydrodynamic equilibrium in which the vapor condensing upon the condenser surface is immediately returned to the vaporizing surface and revaporized with the amount of wetted surface of the vaporizer always just sufficient to effect the transfer of heat from the source at the rate required to equalize the temperature of the condenser surface with that of the liquid in the control chamber.

Due to the automatic establishment of thermal and hydrodynamic equilibrium in the improved system in case the temperature of the condenser surface should tend to fall upon increased dissipation of heat therefrom, the vapor pressure in the control chamber thereupon becomes effective to expel additional liquid into the vapor heat exchange system and thereby effect transfer of heat at a greater rate from the source through the vaporizing surface to the condensing surface. This will result in increasing the wetted surface of the vaporizer to obtain the higher rate of heat transfer from the heat source to the condenser surface. Conversely in case the temperature of the condenser surface should tend to rise upon decreased dissipation of heat therefrom, then the increased pressure in the vapor system becomes effective to force the return of fluid to the control chamber until the wetted surface of the vaporizer is decreased to the value providing the required rate of heat transfer to maintain the condenser surface temperature the same as the temperature of the liquid in the control chamber. Thus the exchange of fluid between the control chamber and the vapor heat transfer system occurs automatically in accordance with the differential in pressure of the vaporized fluid in the chamber and in the vapor system. Since the vapor system and the chamber are in sealed communication, the differential in pressure of the vaporized fluid in the chamber and in the vaporized system varies directly with the differential in the temperatures thereof. Also since ordinarily there will be no appreciable difference between the temperature of the control chamber itself and the temperature of the vaporized fluid therein or between the temperature of the condenser surface and the temperature of the vaporized fluid condensing thereon, the heat transfer system of the present invention operates automatically to establish the thermal and hydrodynamic equilibriums in which the condenser surface is maintained at practically the same temperature as the temperature of the control chamber.

With the temperature of the condenser surface thus correlated automatically at all times with that of the liquid in the control chamber, it will be seen that any selected variation in the temperature of the liquid in the control chamber will result in a corresponding variation in the temperature of the condenser surface. Consequently, by selectively varying the heat input of a relatively small capacity pilot heater the temperature of the liquid in the control chamber readily may be varied between wide limits as desired and thereby effect a corresponding variation in the temperature of the condenser surface as well as a corresponding variation in the rate of heat transfer from the heat source to the condenser surface. With proper proportion and design, the ratio of heat transfer from the heat source through the vaporizing surface to the condensing surface may be made several hundred times the heat input to the liquid control chamber thereby in effect providing an exceptionally large amplification factor in the control. This is particularly true where steam is the source of heat since the latent heat released upon condensation of the steam at the vaporizing surface of the heat transfer system is readily transferred as latent heat in the vapor system thereby providing exceptionally large heat transfer coefficients throughout the entire system.

Preferably the pilot heater for determining the temperature of the liquid in the control chamber is in the form of an electrical heating unit of relatively small capacity such that the energizing current therefor may be readily varied directly by a thermostatic switch or other sensitive circuit control device. However, other forms of pilot heaters such as a gas flame or the like may be used if desired. The control chamber is preferably located remotely from both vaporizing and the condensing surfaces of the vapor system so that interchange of heat between the control chamber and the vaporizing or condensing surfaces is reduced to the minimum, thereby facilitating independent variation of the temperature of the liquid in the control chamber in accordance with the heat input of the pilot heater.

While the invention is of general application and the principle thereof may be carried out in various ways by those skilled in the art, the accompanying drawings illustrate preferred embodiments thereof applied to specific heat transfer service. Fig. 1 diagrammatically shows, partly in section, a preferred form of air heating radiator unit with the circulating fluid vaporizing and condensing heat transfer system therefor deriving heat from a steam chamber and the liquid in the control chamber electrically heated under the control of a thermostatic switch. Fig. 2 is a diagram illustrating a typical control of room temperature that may be obtained by means of the air heating radiator unit shown in Fig. 1. Fig. 3 shows a modified form of the air heating unit provided with a pair of cascaded liquid control chambers in order to increase the overall amplification factor. Fig. 4 diagrammatically shows, partly in section, a forced convection air heater embodying a further modification of the invention to provide for a maximum heat transfer in a minimum space with a minimum amount of material and thereby facilitate manufacture, installation and operation. Fig. 5 diagrammatically shows partly in section, a cooling or refrigeration apparatus embodying the invention to regulate the transfer of heat out of a heat insulated enclosure. Fig. 6 shows a precision temperature control apparatus embodying the present invention and adapted to maintain a heat insulated enclosure at a desired predetermined temperature within very close limits. Fig. 7 shows a hot water heater embodying the invention to provide accurate temperature control and freedom from trouble with complicated moving control valves and the like.

In Fig. 1 the radiator 10 for heating the air in the room indicated by the dotted lines 25 preferably is formed of suitably pressed metal plates welded together to form a series of interconnected vapor condensing columns 11 with open air circulation passages 12 therebetween to facilitate dissipation of heat from the radiator to the air. The bottom wall of the radiator 10 preferably is sloped so as readily to drain the condensed vapor into the condensate receiving tube 13. Tube 13 is joined with the vaporizing tube 14 having one end thereof sloping downward and extending into the steam chest 15 in which a supply of steam is maintained at all times. The tube 13 serves to connect the vaporizing element 14 and the condensing element 10 in a fluid circulating relation such that the heat transfer fluid is repeatedly vaporized and condensed with the vaporized fluid circulating from the vaporizing element to the condensing element and the condensed fluid circulating from the condensing element to the vaporizing element. The steam is supplied from any suitable boiler or other source, not shown, by the steam supply pipe 16 which also serves to return the condensed steam to the source. A suitable heat insulating covering 17 effectively prevents any appreciable dissipation of heat from the steam chest 15, the steam supply pipe 16 as well as from the vaporizing tube 14 except through the operation of the improved fluid circulating heat transfer system of the present invention in the manner described hereinafter.

A closed liquid control chamber or condensate accumulating reservoir 20 is located remotely from both the vaporizing surface of tube 14 and the condensing surface of radiator 10 and has the relatively small size tube 21 communicating between the bottom thereof and the bottom of the condensate receiving trap 13. This serves to minimize the transfer of any heat between the control chamber 20 and the main heat transfer system consisting of vaporizer tube 14 and radiator 10.

In the preferred form of the invention illustrated in Fig. 1 an electrical heating unit 22 of the cartridge type is mounted inside the tube 28 which is sealed into the liquid control chamber 20. The electrical heating unit 22 is of relatively small capacity and is energized at low voltage from the secondary of the transformer 23 directly under the control of the thermostatic switch 24 as only a wattage comparable to that of an ordinary electric lamp bulb is required. The thermostatic switch 24 operates in response to variations in the temperature of an enclosure such as a room represented diagrammatically by the dotted lines 25 in which it is desired that the air is to be maintained at a constant predetermined temperature by regulating the temperature of the radiator 10.

The vapor condensing radiator 10, vaporizing tube 14, and the liquid control chamber 20 as well as the intercommunicating tubes 13 and 21 therebetween are preferably all joined together and hermetically sealed by welding or brazing so that a closed vapor tight heat transfer system is obtained. This entire system is then evacuated of substantially all non-condensable gases through a suitable evacuating connection 26. Thereafter a predetermined charge of suitable vaporizable liquid such as water, alcohol, or the like is introduced into the closed system. The amount of this liquid charge is such as to insure that the entire effective heat transfer surface of the vaporizing tube within the steam chest 15 may be effectively wetted under maximum heat transfer conditions. Ordinarily this condition may be obtained when the volume of the liquid charge is sufficient to fill the effective portion of the vaporizing tube 14 within the steam chest 15 substantially one third full. Preferably the volume of the control chamber 20 is made somewhat larger than necessary to contain the total amount of liquid with which the system is charged. This insures that substantially all of the liquid in the system can be withdrawn into the control chamber 20 and thereby practically stop the transfer of heat from the steam chest 15 through the vaporizer 14 to the radiator 10 whenever required. Since the system is evacuated and charged with a vaporizable liquid, some extremely small portion of the liquid will of course remain as vapor with the saturated vapor pressure in the system corresponding to the temperature of the remaining liquid. However, since the vapor remaining does not condense, practically no heat transfer can occur. Under such conditions, however, additional amounts of liquid will immediately vaporize whenever the temperature of the liquid in control chamber 20 is raised.

After the vapor system is exhausted and charged with the proper amount of fluid, any small amount of non-condensable gas which may happen to remain in the system will be forced by the movement of the vapor into the upper portion of the radiator 10 without any serious interference with the operation of the vapor system. In order to reduce the non-condensable gases in the system to a minimum, preferably the apparatus is baked or heated to a relatively high temperature during the exhausting process. This insures the decomposition of any organic material such as oil or the like which may happen to remain on the inner surfaces of the apparatus after the manufacturing process is completed.

After exhaustion and charging of the system through the charging connection 26 is completed, this connection is pinched and sealed in the usual manner.

In operation when the temperature of the air in the enclosure or room 25 falls below the predetermined value at which the thermostatic switch 24 is set to respond, the thermostat closes its contacts thereby energizing the electric heating unit 22 or pilot heater from the secondary of the transformer 23. Preferably the wattage input of the electrical heating unit or pilot heater 22 is made such that under ordinary ambient air conditions, heat will be imparted to the control chamber 20 at the proper rate to effect the vaporization of a small portion of the liquid therein required to generate a vapor pressure sufficient to expel substantially all of the liquid from the chamber 20 in a predetermined time interval such for example, as 15 or 20 minutes.

Thus as soon as the temperature of the liquid in chamber 20 is raised due to the heat input of the pilot heater 22, a small portion of the liquid is at once vaporized. This creates an excess vapor pressure above the liquid in control chamber 20. This excess vapor pressure is effective to force liquid from the bottom of chamber 20 through trap 21 into the condensate return trap 13. As soon as the level of the liquid in trap 13 rises above the entrance to the vaporizing tube 14, the expelled liquid immediately flows toward the end of the tube extending within the steam chest 15 thereby wetting the vaporizing surface of tube 14. Thereupon the liquid immediately absorbs heat and is vaporized so as to be subsequently condensed in radiator 10. The resulting increase of vapor pressure in the tube 14 and radiator 10 retards or even stops momentarily the further supply of liquid from the control chamber 20. However, as the temperature of the liquid in control chamber 20 continues to increase due to the heat input of pilot heater 22, an additional amount of liquid is vaporized therein and as a result more and more of the liquid is expelled into the vaporizing system.

As the rate of transfer of heat from the steam chest 15 through the vaporizer surface of the tube 14 to the radiator 10 varies with the amount of liquid effective to wet the vaporizer surface, the heating action of the radiator 10 upon the ambient air of the enclosure 25 is rapidly increased as more and more of the liquid becomes effective to wet the vaporizing surface. Consequently, the temperature of the ambient air to which the thermostat 24 is responsive increases. When the temperature is reached at which the thermostat 24 is set to open its contact, the pilot heater 22 becomes deenergized. As a result further input of heat to the liquid remaining in the chamber 20 is stopped.

During this process the temperature $T_2$ of the condensing surface of the radiator 10 at all times corresponds substantially to the temperature $T_1$ of the liquid in the control chamber 20. Thus when the input of heat to the chamber 20 is stopped and the temperature of this chamber begins to decrease due to the dissipation of heat to the environment, the vapor pressure within the chamber 20 decreases. This allows a part of the vapor condensing in radiator 10 and draining into the condensate return tube 13 to reenter the control chamber 20. As the temperature $T_1$ of the liquid in the control chamber 20 continues to decrease, more and more of the liquid is withdrawn from the vapor system.

Preferably the control chamber 20 is so proportioned and designed that its rate of heat dissipation to its environment under normal conditions will reduce the temperature thereof to substantially room temperature in a period of approximately 15 to 20 minutes. In other words, the cooling time of the chamber 20 is made to correspond with the heating time in order to provide the best conditions for modulated heating control operation by the thermostatic switch 24.

When the time of response of the thermostatic switch 24 to variations from the desired predetermined temperature is made appreciably less than the heating and cooling time of the control chamber 20, as by means of the preheat coil 27, substantially modulated heating control of the enclosure 25 will result due to the intermittent action of the thermostat. That is, when the thermostatic switch 24 is made quickly responsive to an increase or decrease in the temperature of the ambient air in the enclosure 25, the heat input of the pilot heater 22 is started and stopped at relatively frequent intervals so that due to the intermittent heating action as well as the temporary heat storage in chamber 20 the temperature of the liquid in chamber 20 is practically maintained at an average value which varies only slightly from the desired predetermined temperature value. This will result in maintaining the temperature $T_2$ of the radiator 10 at a corresponding average value such as is required to maintain the ambient air in the enclosure 25 substantially at the predetermined temperature value determined by the setting of the thermostat 24.

The modulating heating control action just described is illustrated diagrammatically in Fig. 2. In this diagram the temperature $T_1$ of the liquid in the control chamber 20 and the temperature $T_2$ of the radiator surface are automatically maintained at substantially the same average value as indicated by the dotted line AB so as to maintain the temperature $T_3$ of the ambient air within the enclosure 25 at a substantially constant value C when the temperature of the ambient air surrounding the enclosure 25 is at the value D.

In case the temperature of the ambient air surrounding the enclosure 25 such, for example, as the outdoor temperature should happen to fall to a materially lower value such as E, then the temperatures $T_1$ and $T_2$ of the heating system are automatically increased to the average value indicated by the dotted line FG. This change in the values of temperatures $T_1$ and $T_2$ can be effected relatively quickly so that practically no appreciable variation in the temperature $C_3$ of the air within the enclosure 25 will occur.

Thus by means of the present invention the thermostatic control of the transfer of heat from a source to a heat dissipating body to maintain a substantially constant predetermined temperature condition may be readily effected without the use of complicated valves or other moving mechanism subject to leakage and other maintenance difficulties. At the same time rapid and accurate control of a relatively large amount of heat transfer may readily be effected by a relatively sensitive and delicate control instrument such as the ordinary thermostatic switch provided with a preheat coil to insure intermittent action thereof.

In the modification shown in Fig. 3, the air heating radiator 10' is of substantially the same construction as described in connection with Fig. 1. The vaporizer 30, however, is in the form of a double chamber casing having the heat transfer wall 31 separating the steam chamber 32 from the vaporizing chamber 33. Steam is admitted to the steam chamber 32 from a suitable source (not shown) through the steam inlet pipe 34 and the condensed steam is conducted through the return pipe 35.

The most important difference, however, is the provision of the cascaded liquid control chambers 40 and 41. The liquid control chamber 40 is shown connected by the tube 42 to the condensate return tube 13' from the radiator 10' and is provided with an internal heat transfer tube 42 which serves the double function of a condenser and a vaporizer. The pilot control chamber 41 is connected by the tube 44 with the interior of heat transfer tube 43 and in turn is provided with an electrical heating unit 45. The vaporizer tube 46 having one end thereof extending inside of the steam chamber 32 is connected so as to extend somewhat above the bottom of the tube 43.

Thus in the modification shown in Fig. 3, there are two entirely separate vaporizing and condensing systems, each being evacuated and charged with a suitable amount of vaporizable liquid. The main heat exchange vapor system consists of the radiators 10', the vaporizing chamber 33 with the liquid control chamber 40 communicating therewith. The auxiliary vapor system consists of the combined condensing and vaporizing tube 43, the vaporizing tube 46 with the pilot control chamber 41 connected therewith.

In operation when the contacts of the thermostat 24 are closed, the electrical heating unit 45 of the pilot control chamber 41 is energized from the secondary of the transformer 23. As soon as a sufficient vapor pressure is created in the pilot control chamber 41 to force liquid therefrom into the vaporizing tube 46, heat is then transferred from the steam chest 32 through the wetted surface of the vaporizing tube 46 to the combined condenser and vaporizing tube 43. The condensation of the vapor supplied from the wetted surface of tube 46 to the tube 43 serves to impart heat to the liquid in the control chamber 40. As a result liquid is expelled from chamber 40 into the main vaporizing chamber 33 to start the transfer of heat from the steam chamber 32 to the radiator 10', the operation being the same as previously described.

By means of the cascade control chamber arrangement shown in Fig. 3, the amount of heat input to the pilot control chamber 41 is materially reduced in proportion to the total heat exchange occurring in the main vapor system. In this way the cascaded control chambers 40 and 41 serve to increase the overall amplification factor from several hundred to several thousand since the amplification factors of the two vapor heat transfer systems are in effect multiplied.

In the improved form of forced convection air heater illustrated in Fig. 4, the present invention is utilized to regulate the transfer of heat between the inner pipes 50 to which steam or other suitable heating medium is constantly supplied and the outer tubes 51 which carry suitable fins 52 for dissipating heat to the air which is forced over the surface of the fins by the electric motor driven blower 53 or other suitable means. The pipes 50 and tubes 51 preferably are disposed concentrically with a relatively small vapor heat transfer control space between the walls thereof. With this arrangement the vaporizing pipes 50 and the condensing tubes 51 are connected directly in fluid circulating relation. The pipes 50 are joined to suitable headers 54 which are connected to the steam lines or other source of heating medium. The outer tubes 51 are sealed preferably by welding or brazing at each end either directly to the tubes 50 as indicated in the drawings or to the headers 53 and 54, if so desired.

Preferably the ends of the tubes 51 are reversely curved as indicated in the drawings so as to provide for relative expansion between the steam pipe 50 and the tube 51 when they are subjected to different temperatures. The steam headers 54 are covered with a layer of good heat insulating material so as effectively to prevent transfer of heat therefrom except when the vapor heat transfer system is in operation. The number of heat transfer pipes and tubes in the radiator will, of course, be proportioned to meet the particular heating service in which the radiator will be used.

While in the preferred form of apparatus shown in Fig. 4, the heat transfer tubes 50 and 51 extend in a vertical direction, it will be understood that they may be horizontal or in a sloping plane if desired.

In any case, the construction of the unit is such that all the vapor spaces between the inner steam pipes 50 and the surrounding air heating tube 51 after exhaustion and charging of the system with the proper amount of vaporizable liquid through the sealing tube 55 are in communication with each other and connected to the liquid control chamber 57. As shown, a suitable tube 58 serves to interconnect the vapor space of the two concentric tubular sections illustrated while the tube 59 having the heater coil 60 formed therein serves to connect all of the spaces to the liquid control chamber 57.

Preferably the tube 59 extends from the control chamber 57 and is then coiled about one of the steam headers 54 as shown in order to prevaporize the liquid expelled from the control chamber 57 before it is introduced into the vapor space of the heat transfer sections of the radiator unit.

The prevaporization of the liquid in coil 60 practically eliminates all possibility of surging, that is, the introduction of an excessive amount of liquid into the vapor space of the heat transfer apparatus such that when the liquid is vaporized the resulting pressure exceeds that in the control chamber. Under such conditions the excess pressure may force the return of some of the liquid into the control chamber and an unstable hydrodynamic condition may occur. However, by providing the prevaporizing coil 60 in the liquid supply tube 59, the tendency for surging may be practically eliminated.

To further stabilize the operation of the vapor heated transfer apparatus, the liquid supply tube 59, preferably is provided with a series of heat radiating fins 61. These fins serve to insure condensation of the vapor so that no vapor is forced into the control chamber 57. If this should occur, an appreciable transfer of heat from the main heat transfer system to the liquid control chamber would result and thereby interfere with the normal control functions performed by the control chamber.

A further advantageous feature illustrated in Fig. 4 is the provision of the enlargement or bulb 65 in the liquid supply tube 59. Preferably this is located just above the top of the control chamber 57 so as to permit any noncondensable gases remaining in the system to accumulate therein without being carried along by the liquid returned to the control chamber 57.

In operation of the unit shown in Fig. 4 the thermostat 24 controls the energization of the pilot electric heating unit 22 for the liquid control chamber 57 in substantially the same manner as previously described. The heat input of the pilot heater 22 likewise serves to raise the temperature of the liquid in the control chamber 57 and thereby expel liquid through the tube 59 and the prevaporizing coil 60 into the heat transfer spaces between the steam pipes 50 and the finned tubes 51. Since this liquid passes through the prevaporizing coil 60, the liquid is always vaporized before it is introduced into the vapor heat transfer spaces.

In the same manner as previously described, the amount of vapor in the heat transfer spaces is always automatically proportioned so that the temperature of the condensing surfaces of the finned tubes 51 is equalized with that maintained in the liquid control chamber 57. Hence when the control of the pilot heater 22 by the thermostat 24 is such as to maintain the temperature of the liquid in the control chamber 57 at a desired predetermined value the heat transfer system operates to provide a substantially constant temperature in the space surrounding the thermostat.

Whenever the pilot heater 22 is deenergized, the temperature in the control chamber 57 decreases, thereby permitting the vapor pressure in the heat transfer system to force the return of vapor back through the supply tube 59 toward the control chamber 57. However, this vapor after passing through the prevaporizing coil 60 is always condensed in the finned portion of the tube 59.

As shown in Fig. 4, the liquid control chamber 57 as well as the finned portions of the tube 59 are located in the path of the heated air as it leaves the forced convection heater unit. By this arrangement, the heat input of the electric heater 22 required for effective control of the heat transfer system over a wide range of temperature variation is reduced to the minimum due to a regenerative action of the heated air passing over the control chamber. For example, with a given watt input of the heater 22, the temperature of the control chamber 57 will normally be raised a certain amount above its ambient. In turn this increase in temperature of the control chamber serves to expel liquid to start a heat transfer action in the heating unit. The resulting heating of the ambient air in turn serves to effect further increase in the temperature of the control chamber 57. This is due to the fact that the increase in the ambient enables the watt input of the heater 22 to further increase the temperature of the control chamber. This action just described is cumulative up to the point where sufficient liquid is expelled from the control chamber 57 into the heat transfer system to wet all of the vaporizing surface.

Whenever the pilot heater 22 is deenergized to decrease the heat transfer action, the liquid control chamber 57 cools and vapor then is expelled from the heat transfer spaces between the steam pipes 50 and the fin tubes 51 into the tube 59. This vapor is condensed in the finned portion of the tube 59 and then returns to the control chamber 57. As the heating of the air by the finned tubes 51 is thus decreased, the temperature of the ambient air surrounding the control chamber 57 is decreased thereby further facilitating the dissipation of heat from the control chamber. In this way in effect a reverse regenerative action between the control chamber 57 and the air heater unit is obtained. Hence by locating the control chamber 57 in the path of the heated air leaving the heater unit to obtain a regenerative action in both heating and cooling of the chamber, the power requirement of the pilot heater 22 may be reduced to a minimum for a given rate of variation in the heating action of the forced air convection heating unit.

In the cooling apparatus shown in Fig. 5, a modified form of the invention is utilized to remove heat from the space within the casing 70 at variable rates so as to maintain a substantially constant predetermined temperature therein. The heat generating apparatus 71, shown diagrammatically inside casing 70, may be a mercury arc rectifier or any other form of heat generator or the like which it is desired to maintain at some constant predetermined temperature preferably but not necessarily higher than the temperature of the ambient air surrounding the casing 70. Thus the apparatus shown in Fig. 5 also may be employed to remove heat from a liquid or other material circulating through the interior of the casing 70 so as to maintain the liquid at a substantially constant predetermined temperature.

The heat transfer system of Fig. 5 consists of a closed tubular vapor heat transfer loop 72 having the vaporizing coil portion 73 located inside of the casing 70 to absorb heat therefrom and the condensing coil portion 74 located exteriorly of the casing 70 to dissipate heat either to the surrounding ambient or to any other suitable cooling medium. The vapor loop system is exhausted and charged with a suitable amount of liquid in substantially the same manner as previously described. The liquid control chamber 75 is connected by the tube 76 to the condensate trap 77 which is located in the return leg of the loop between the bottom coil of the condenser 74 and the vaporizer coil 73.

In this cooling apparatus the thermostatic switch 24 is located so as to be responsive to the temperature of the heat generating apparatus 71 or of the fluid or other material inside of the casing 70. The thermostat 24 controls the energization of the pilot heater 22 from the secondary of the transformer 23 in precisely the same manner as in the embodiments of the invention previously described except that the thermostat 24 is arranged to close its contacts when the temperature inside casing 70 exceeds a predetermined desired value.

In operation when the temperature inside of casing 70 to which the thermostat 24 is subjected exceeds the desired predetermined value, the contacts of the thermostat are closed thereby energizing the pilot heater 22. This results in expelling liquid from the control chamber 75 into the vapor heat transfer system. The expelled liquid then is repeatedly vaporized in the vaporizing coil portion 73 and condensed in the coil condensing portion 74. In this way heat is removed from the interior of the casing 70 at a rate dependent upon the amount of wetted surface of the vaporizing coil 73 which in turn is regulated by the operation of the pilot heater 75 under the control of thermostat 24.

When heat is removed at a sufficient rate from the interior of the casing 70 to reduce the temperature to which the thermostat 74 is subjected, the contacts thereof open to deenergize the pilot heater 22. This results in a reduction of the vapor pressure in the control chamber 75, thereby permitting the vapor pressure in the heat transfer system to force the return of condensed fluid into the control chamber and thereby decrease the wetted surface of the vaporizing coils 73 in substantially the same manner as previously described. In this way the transfer of heat therefrom may be regulated to maintain a substantially constant temperature inside casing 70.

The modified form of the invention shown in Fig. 6 may be employed in case it is desired to supply heat to maintain a predetermined temperature within an enclosure within very close and accurate limits. In this arrangement the temperature within the heat insulating enclosure 80 is regulated by means of the heating coils 81 to which heat is transferred from the steam chest 82. The heat dissipating coils 81 have a relatively large exposed surface relative to the heat dissipating surface of the enclosure. Preferably the entire inner surface of the enclosure 80 is made of metal and the coils 81 secured in good heat conducting relation therewith by welding or brazing.

The ends of the heating coil 81 are joined in communication with the vaporizing chamber 85 which is in good heat transfer relation with the steam chest 82. Steam is supplied from a suitable source to steam chest 82 through the steam supply line 83 and the condensate is returned through the pipe 84 so as to maintain at all times a supply of live steam in the chest 82.

The condensate trap 86 is located in the return tube 87 which extends from the bottom end of the heat dissipating coils 81 to the vaporizing chamber 85 and is so arranged that condensate will gravitate thereto. The tube 88 extends from the bottom of the condensate trap 86 into the bottom of the liquid control chamber 89.

In order to obtain precise temperature control, the control chamber 89 is located within a recess 90 formed in the top of the heat insulated chamber 91 which forms the condenser portion of an auxiliary vapor heat transfer system which receives heat from the vaporizing tube 92 extending into the steam chest 82.

The auxiliary vapor heat transfer system formed by the condensing chamber 91 and the vaporizing tube 92 is substantially the same as the constant temperature device more fully described and broadly claimed in my Patent No. 2,026,423, granted Dec. 31, 1935.

The vaporizing tube 92 extends through and somewhat above the bottom of the pocket 93 formed in the bottom of the condenser chamber 91. A heat insulated control chamber 95 is connected through the tube 96 with the bottom of the pocket 93 and through the tube 97 with the pocket above the level of the end of the vaporizing tube 92 therein. Both of the tubes 96 and 97 are made of flexible material, such as soft copper, so that the level of the auxiliary chamber 95 may be varied by means of the adjusting screw 98.

The entire auxiliary heat transfer system including the condensing chamber 91, the vaporizing tube 92 and the control chamber 95 are suitably exhausted and charged with an amount of liquid such that with the control chamber 95 approximately half full of liquid, the remaining fluid in the system will serve to transfer sufficient heat from the vaporizing tube 92 to the control chamber 89 to maintain the temperature of the chamber 89 approximately at the predetermined value which it is desired to maintain within the heat insulated enclosure 80. An adjustment of the temperature of the control chamber 89 may be obtained by varying the level of the control chamber 95.

Briefly, the operation of the apparatus shown in Fig. 6 is as follows.

As long as a supply of steam is maintained in the steam chest 82, the temperature of the control chamber 89 will always be maintained at a substantially constant predetermined value irrespective of variations in the ambient of the apparatus so long as the ambient remains below the predetermined temperature value. The vaporization of liquid in the tube 92 and the condensation of the vapor in the chamber 91 automatically proceeds at the rate required to maintain this predetermined temperature value.

With the control chamber 89 maintained at a substantially constant predetermined value at all times, it follows that the proper amount of liquid will be expelled from the liquid control chamber 89 into the main vapor heat transfer system to effect a transfer of heat from the vaporizing chamber 85 to the heat dissipating coils 81 at the proper rate to maintain the interior of the chamber 80 at the temperature value corresponding to that of the control chamber 89.

In applying the improvements of the present invention to water heating work, the preferred form of apparatus shown in Fig. 7 may be employed with advantage. In this apparatus, a hot water storage tank 115 of suitable capacity to meet the normal demands has an inlet pipe 117 connected to a suitable water source and the outlet pipe 116 connected to supply the hot water stored therein for showers, washing or any other service wherein hot water at a substantially constant predetermined temperature is desired. The water in tank 115 is heated by the transfer of heat from the steam chest 118 which is connected by the steam supply pipe 99 and the condensate return pipe 100 to a boiler or other suitable source of live steam. An ordinary form of condensate trap 101 may be provided if desired to prevent loss of live steam from the steam chest 118 through the return pipe 100.

The transfer of heat from the steam chest 118 is accomplished by means of a plurality of interconnected tubes 102 each of which has a vaporizing portion extending into the steam chest 118 and a condensing portion extending into the water heating chamber 103. The vaporizing and condensing portions of tubes 102 are connected directly in fluid circulating relation. The size and number of tubes 102 are properly proportioned for the maximum heat transfer duty to be performed. All of these tubes are interconnected by the connecting tubes 102a. One or more of the tubes 102 are provided with a condensate trap 104 which is connected by tube 105 with the liquid control chamber 106 having the electric pilot heater 107 in heat transfer relation with the liquid therein. The tubes 102 as well as the interconnected liquid control chamber 106 are suitably exhausted and charged with a predetermined amount of vaporizable liquid in substantially the same manner as previously described.

In the water heating apparatus, the energization of the pilot electric heater 107 is controlled by the main thermostatic switch 110 which may be of the expansible bellows type as shown having the temperature responsive bulb 110a thereof preferably located to be responsive to the temperature in the water heating chamber 103. The bulb 110a may be located in the main water storage tank 115 if desired. An excess temperature thermostat 111 is connected in series with the main control thermostat 110 and also may be of the expansible bellows type as shown having the temperature responsive bulb 111a thereof responsive to the temperature in the liquid control chamber 106.

In order to prevent dissipation of heat from the steam chest 118 as well as the steam supply line 99, a covering of suitable heat insulating material 108 preferably is provided. The water heating chamber 103 is connected to the main water storage tank 115 by the pipe 112 which extends from the top of the chamber 103 to the top of the tank 115 and by the pipe 113 which extends from the bottom of the chamber 103 to the bottom of the tank 115 thereby providing for thermosyphon circulation of the water from tank 115 through the water heating chamber 103.

In operation a supply of live steam is maintained at all times in the steam chest 118 with practically no heat loss resulting therefrom except when the vapor heat transfer system is in operation. The main temperature controlling thermostatic switch 110 is set to respond when the temperature of the water in the chamber 103 varies from a predetermined value. The excess temperature thermostat 111 is set so as normally to maintain its contacts closed but to open these contacts whenever the temperature of the liquid control chamber 106 exceeds a predetermined safe value. Preferably the excess temperature value is made such that the temperature of the condensing portion of tubes 102 is always maintained below the value at which excessive deposits of mineral salts or "liming" occurs. Also the limiting of the temperature prevents damage by overheating to either the electric pilot heater 107 or to the control chamber itself.

In order to provide for a rapid heating control action, the pilot heater 107 preferably has a relatively large wattage input compared to the modifications of the invention previously described so as rapidly to heat the liquid control chamber 106 and thereby rapidly expel liquid therefrom into the vapor heat transfer system. This is particularly advantageous in taking care of conditions when an excessively large demand for hot water is made upon the storage tank 115 and the temperature of the water in chamber 103 falls materially below the predetermined desired value. In this case the contacts of the main control thermostat 110 are closed and the relatively large wattage input of the heater 107 effects the displacement of substantially all of the liquid in the control chamber 106 into the vapor heat transfer system. As the result heat is transferred from the steam chest 118 to the water heating chamber 103 at the maximum rate and thereby rapidly restores the supply of hot water in the tank 115 to the predetermined desired temperature. Under these operating conditions when the temperature of the control chamber 106 reaches the limiting value, the excess temperature thermostat 111 opens its contacts to prevent further heat input to the control chamber. Thereafter the excess temperature thermostat 111 will open and reclose its contacts repeatedly to maintain the control chamber 106 at the maximum temperature until at least the water in the heating chamber 103 is restored to the predetermined temperature value at which the main control thermostat 110 opens its contacts, thereby deenergizing the pilot heater 106.

Under these conditions the temperature of the control chamber 106 returns to normal value and the condensed vapor accumulating in the condensate trap 104 is returned into the control chamber 106 thereby effectively stopping further transfer of heat from the steam chest 118 to the water heating chamber 103.

In case the demands for hot water from the storage tank 115 are relatively small, the main control thermostat 110 will then serve to energize and deenergize the pilot heater 107 to maintain the temperature of the water in chamber 103 constantly at the desired predetermined value without having the temperature of the control chamber 106 increased to the value at which the excess temperature thermostat 110 operates.

Thus by means of the present invention the rate of heat transfer from the steam chest 118 to the water heating chamber 103 is variable rapidly between wide limits to meet the widely varying demands ordinarily encountered in hot water heating service. Furthermore, all the usual difficulties encountered with regulating steam valves and other forms of hot water control are effectively eliminated.

A further important advantage provided by the present invention in water heating work is that the maximum temperature of the water is at all times limited to the desired value at which the main control thermostat is set to open its contacts. This effectively prevents the dangers of scalding where the water is used in shower baths or the like. Furthermore, with the temperature responsive element of the main temperature control thermostat directly responsive to the temperature of the water heating chamber, substantially all of the water in the main storage tank may be raised to the desired value without stratification or accumulation of an excessive high temperature layer of water at the top of the tank as may occur in the ordinary water heating equipment.

It will be understood by those skilled in the art that the principle of the invention embodied in the several preferred forms of apparatus described above is subject to various modifications and changes without departing from the spirit of the invention. For example, the liquid control chamber is shown in the various preferred forms of apparatus as connected and arranged so that liquid is expelled from the bottom thereof into the main heat transfer system. Such arrangement is preferred as it reduces the power requirements for the pilot heater to a minimum. However, in case reduction of the power requirements of the pilot heater is not desired, the top of the liquid control chamber may be connected to the main heat transfer system so that the liquid therein is entirely vaporized by the heat input of the pilot heater and the resulting vapor is then transferred to the main heat transfer system. With such arrangement when the pilot heater is deenergized, the vapor in the liquid control chamber will condense, thereby drawing additional vapor from the main heat transfer system which is in turn condensed. This condensation process will continue until substantially all of the fluid is returned into the liquid control chamber.

Also while a single liquid control chamber has been shown in the preferred forms of the invention illustrated, it will be understood that if desired a series of liquid control chambers may be provided in communication with a common condensate trap and operated independently or jointly to expel different predetermined volumes of liquid into the main heat transfer system. By this arrangement the rate of heat transfer of the main system may be graduated in accordance with the relative volumes of the liquid expelled by operating one or more of the control chambers. In such an arrangement the temperature of each control chamber in operation preferably would be raised directly to the maximum value so as to prevent return of condensate thereto upon operation of other control chambers. Various other modifications and refinedements of the invention will be apparent.

The present invention, is in certain aspects, an improvement upon the constant temperature device described and claimed in my Patent No. 2,026,423, granted Dec. 31, 1935, previously mentioned.

What I claim as new and desire to secure by Letters Patent in the United States is:

1. Apparatus for heating water having a steam chamber provided with means for maintaining a supply of live steam therein, a separate chamber above said steam chamber and provided with means for circulating water therethrough, and a sealed fluid vaporizing and condensing conduit substantially free of non-condensable fluid and extending into each of said chambers and having thermostatically controlled means responsive to water temperature for introducing and extracting vaporizable fluid therein to regulate the transfer of heat between said chambers.

2. In a fluid vaporizing and condensing heat transfer apparatus, the combination of means providing a condensable fluid heat supply chamber and a superposed spaced apart circulating fluid heat dissipating chamber, and a sealed fluid vaporizing and condensing conduit substantially free of non-condensable fluid extending into each of said chambers and provided with a condensate return trap having thermostatically controlled means responsive to the temperature of the circulating fluid for introducing and extracting vaporizable fluid therein to regulate the transfer of heat between said chambers.

3. A heat transfer device comprising an enclosure having fluid vaporizing and condensing elements in fluid circulating heat transfer relation and a control chamber having a conduit opening into the lower portion thereof and in communication with said enclosure for trapping condensate in said chamber to control the transfer of heat between said elements and said chamber being provided with separately operable heat transfer means for varying the temperature of the fluid in said chamber below and above the condensing temperature of the fluid in said enclosure to regulate the amount of condensate trapped therein.

4. A heat transfer device comprising an enclosure having fluid vaporizing and condensing elements in fluid circulating heat transfer relation and a condensate accumulating chamber having a conduit opening into the lower portion thereof and communicating with said enclosure and provided with separately operable heat transfer means for varying the temperature of the fluid in said chamber below and above the condensing temperature of the fluid in said enclosure to withdraw fluid from and return fluid into circulation between said elements and thereby vary the rate of heat transfer between said elements.

5. A heat transfer device comprising an enclosure having fluid vaporizing and condensing elements in fluid circulating heat transfer relation, a condensate accumulating chamber communicating with said enclosure and provided with separately operable heat transfer means for varying the temperature of the fluid in said chamber below and above the condensing temperature of the fluid in said enclosure to withdraw fluid from and return condensate into circulation between said elements, and means for vaporizing the returned condensate before introduction thereof into circulation between said elements.

6. A heat transfer device comprising an enclosure having fluid vaporizing and condensing elements in fluid circulating relation, a condensate accumulating chamber communicating with said elements and provided with means for varying the temperature thereof to withdraw fluid from and return condensate into circulation between said elements, and cooling means for preventing the introduction of vaporized fluid into said chamber.

7. In a heat transfer device, the combination of an enclosure substantially free of non-condensable fluid and having condensable fluid vaporizing and condensing portions in fluid circulating heat transfer relation, a condensate accumulating chamber having a tube extending upwardly from the bottom portion thereof into communication with said enclosure, and separately operable heat transfer means for varying the temperature of the condensate in said chamber below and above the condensing temperature thereof to vary the vapor pressure in said chamber below and above the vapor pressure existing in said enclosure and thereby withdraw fluid from and return fluid into heat transfer circulation between said portions.

8. A heat transfer device comprising an enclosure having fluid vaporizing and condensing elements in fluid circulating heat transfer relation and a condensate accumulating chamber having a conduit opening into the lower portion thereof, said chamber communicating with said elements for varying the amount of fluid in circulation between said elements responsively to variations in the temperature of the condensate in said chamber above and below the vaporizing temperature thereof, and separately operable heat transfer means for regulating the temperature of the condensate in said control chamber.

9. In a latent heat transfer device, the combination of a sealed enclosure substantially free of non-condensable fluid and having fluid vaporizing and condensing portions in fluid circulating relation for transferring latent heat therebetween, a condensable fluid heat supply means having a condensing surface on the outside of the vaporizing portion of said enclosure for transferring latent heat thereto, and a control reservoir for condensed fluid having a conduit opening into the lower portion thereof, said reservoir communicating with said enclosure and provided with separately operable heat transfer means for regulating the temperature of the fluid in said reservoir to control the accumulation of condensed fluid therein and thereby regulate the rate of latent heat transfer between the vaporizing and condensing portion of said enclosure.

10. In a heat amplifier, the combination of a condensable fluid heat supply means, a main heat transfer device having a fluid vaporizing element in heat transfer relation with said heat supply means and a fluid condensing element in heat transfer relation with said fluid vaporizing element and a fluid accumulating chamber having a conduit opening into the lower portion thereof and in communication with said condensing element for regulating the amount of fluid active in transferring heat between said elements, a separately operable heat transfer device having a fluid vaporizing element in heat transfer relation with said heat supply means, a fluid condensing element in heat transfer relation with said fluid accumulating chamber for heating the fluid accumulated in said chamber, and separately operable means for controlling the amount of fluid active in transferring heat between the elements of said separately operable heat transfer device.

11. In combination, a heat transfer device having fluid vaporizing and condensing elements in fluid circulating relation and provided with a fluid accumulating reservoir having a conduit opening into the lower portion thereof and communicating with said condensing element for regulating the amount of fluid active in transferring heat between said elements, and means including a pair of thermostats, one responsive to a predetermined temperature condition determined by operation of said heat transfer device and the other responsive to the temperature of the fluid in said control reservoir for jointly controlling the amount of fluid accumulated in said reservoir.

12. In a fluid vaporizing and condensing heat transfer system, the combination of a source of heat, a sealed enclosure having a liquid vaporizing surface in heat transfer relation with said source of heat and a vapor condensing heat dissipating surface in fluid circulating heat transfer relation with said vaporizing surface, an auxiliary chamber having a conduit opening into the lower portion thereof and communicating with said enclosure and having a vaporizable fluid therein, and means including a pilot heater for regulating the temperature of the fluid in said chamber to effect exchange of fluid between said chamber and said enclosure substantially in accordance with the differential in temperature of the vaporized fluid in said chamber and enclosure and thereby regulating the temperature of said condensing surface.

MARCUS E. FIENE.